(12) United States Patent
Pan et al.

(10) Patent No.: US 9,674,104 B1
(45) Date of Patent: *Jun. 6, 2017

(54) ADAPTING PROPORTIONAL INTEGRAL CONTROLLER ENHANCED ALGORITHM FOR VARYING NETWORK CONDITIONS IN A NETWORK ENVIRONMENT

(71) Applicant: CISCO TECHNOLOGY, INC., San Jose, CA (US)

(72) Inventors: Rong Pan, Saratoga, CA (US); Preethi Natarajan, Los Gatos, CA (US); Chiara Piglione, San Jose, CA (US); Mythili Suryanarayana Prabhu, San Jose, CA (US); Alon Bernstein, Monte Sereno, CA (US); Frederick J. Baker, Goleta, CA (US)

(73) Assignee: CISCO TECHNOLOGY, INC, San Jose, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 14/156,239

(22) Filed: Jan. 15, 2014

Related U.S. Application Data

(63) Continuation-in-part of application No. 13/874,600, filed on May 1, 2013.

(51) Int. Cl.
*H04L 12/863* (2013.01)
*H04L 12/823* (2013.01)
(Continued)

(52) U.S. Cl.
CPC .............. *H04L 47/50* (2013.01); *H04L 47/32* (2013.01); *H04L 47/56* (2013.01); *H04L 47/625* (2013.01); *H04L 47/12* (2013.01); *H04L 49/9005* (2013.01)

(58) Field of Classification Search
CPC ..... H04L 2012/5681; H04L 2012/5682; H04L 47/25; H04L 47/30; H04L 47/32;
(Continued)

(56) References Cited

U.S. PATENT DOCUMENTS 6,118,761 A * 9/2000 Kalkunte et al. ............. 370/229
6,157,653 A   12/2000 Kline et al.
(Continued)

OTHER PUBLICATIONS

Rong Pan et al., "PIE: A Lightweight Control Scheme to Address the Bufferbloat Problem," Internet Draft, Network Working Group, Dec. 10, 2012, 12 pages; http://tools.ietf.org/html/draft-pan-tsvwg-pie-00.

(Continued)

*Primary Examiner* — Joshua Kading
(74) *Attorney, Agent, or Firm* — Patent Capital Group

(57) ABSTRACT

An example method for adapting Proportional Integral controller Enhanced (PIE) algorithm for varying network conditions is provided and includes estimating an average dequeue rate at which packets are dequeued from a queue of packets maintained in a buffer in a network element operating, estimating a current queuing latency for the queue of packets based on the average dequeue rate, determining a target delay based on the average dequeue rate, the target delay varying with the average dequeue rate according to a predetermined relationship, and calculating a current drop probability associated with a probability that packets arriving at the buffer will be dropped or marked, the current drop probability being calculated using at least the current queuing latency and the target delay. In some embodiments, a threshold for a number of bytes dequeued from the buffer is estimated based on network conditions.

17 Claims, 12 Drawing Sheets

(51) Int. Cl.
    *H04L 12/875*    (2013.01)
    *H04L 12/801*    (2013.01)
    *H04L 12/861*    (2013.01)

(58) Field of Classification Search
    CPC ..... H04L 47/56; H04L 47/562; H04L 47/564;
            H04L 47/566; H04L 47/12; H04L 47/127;
            H04L 47/625; H04L 47/6255; H04L
            47/626; H04L 49/9005
    See application file for complete search history.

(56) References Cited

U.S. PATENT DOCUMENTS

| | | | | |
|---|---|---|---|---|
| 6,996,062 B1* | 2/2006 | Freed et al. | | 370/235 |
| 9,246,829 B2 | 1/2016 | Pan et al. | | |
| 2004/0047594 A1* | 3/2004 | Towler | | 386/46 |
| 2005/0147032 A1 | 7/2005 | Lyon et al. | | |
| 2010/0091770 A1* | 4/2010 | Ishikawa | | H04L 47/20 |
| | | | | 370/389 |
| 2010/0309783 A1 | 12/2010 | Howe | | |
| 2012/0182870 A1 | 7/2012 | Francini | | |
| 2014/0211625 A1* | 7/2014 | White et al. | | 370/235 |
| 2014/0328175 A1* | 11/2014 | Pan et al. | | 370/235 |
| 2015/0372949 A1* | 12/2015 | Eardley | | H04L 49/3045 |
| | | | | 370/229 |

OTHER PUBLICATIONS

USPTO Jan. 23, 2015 Non-Final Office Action from U.S. Appl. No. 13/874,600.

USPTO May 21, 2015 Non-Final Office Action from U.S. Appl. No. 13/874,600.

USPTO Sep. 17, 2015 Notice of Allowance from U.S. Appl. No. 13/874,600.

* cited by examiner

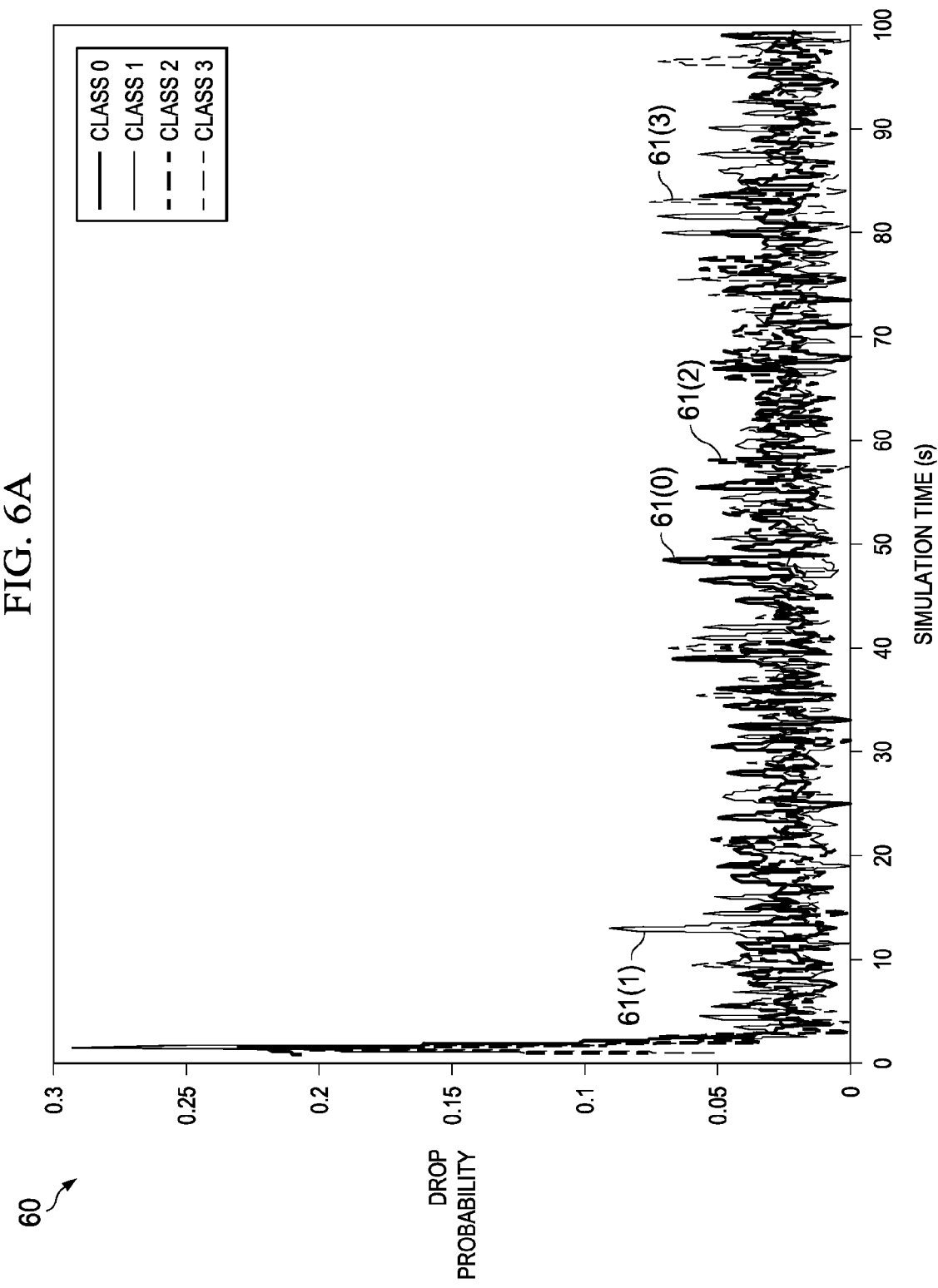

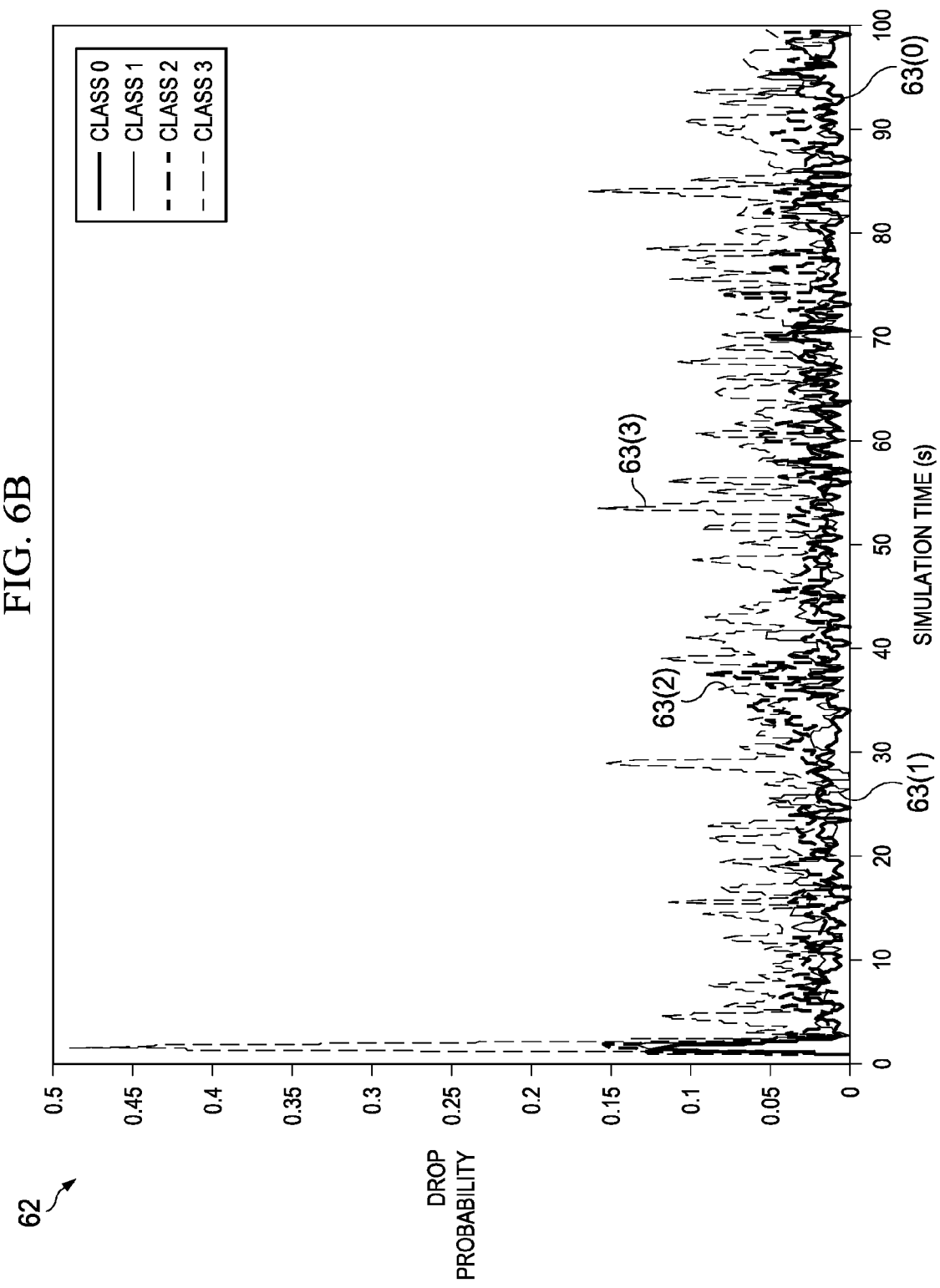

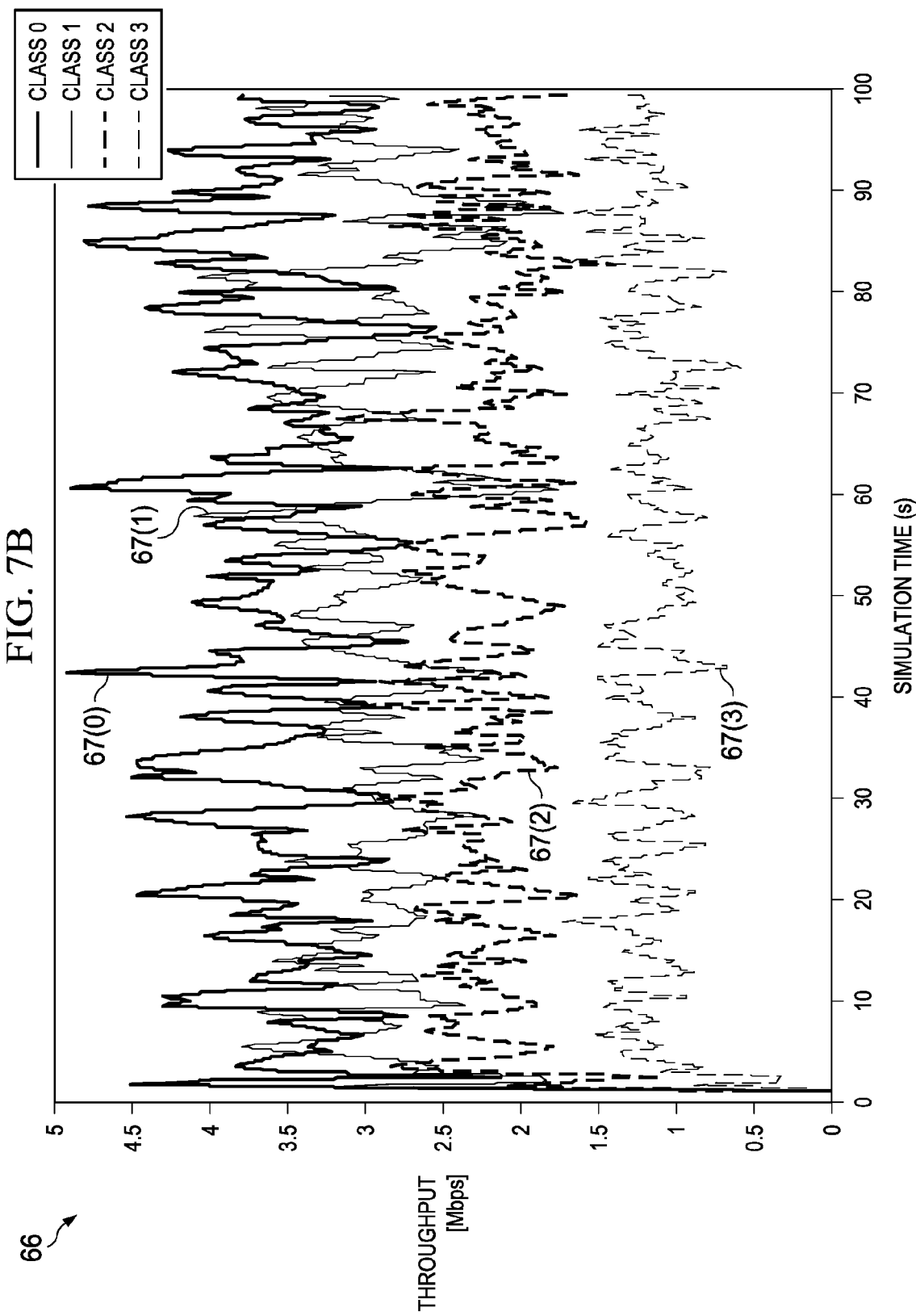

180

```
function dequeue_rate_update(double enqueue_timestamp, long qlen)
{
/* initialize parameters */
long delta_enqueued_bytes = 0;
long delta_dequeued_bytes = 0;
double dequeue_rate = 0.0;

/* determine if a predetermined amount of time (e.g., 0.01s) has elapsed since last update? */
if (enqueue_timestamp - enqueue_timestamp_prev < 0.01)
return;

/* determine if the queue length is a reasonable size (e.g., 3500 bytes) to work with and the queue
was not empty this period (e.g., as indicated by a empty queue flag)? */ if ((qlen < 3500) || (empty_queue_flag)) {
/* move past the current interval, store state */
enqueue_timestamp_prev = enqueue_timestamp;
cum_enqueued_bytes_prev = cum_enqueued_bytes;
qlen_prev = qlen;
empty_queue_flag = 0;
return;
}

/* calculate dequeue rate for the time interval based on queue length and size of packet arrivals */
delta_enqueued_bytes = cum_enqueued_bytes - cum_enqueued_bytes_prev;
delta_dequeued_bytes = qlen_prev + delta_enqueued_bytes - qlen;

dequeue_rate = delta_dequeued_bytes / (enqueue_timestamp - enqueue_timestamp_prev);

/* maintain a smoothly changing dequeue rate over time (e.g., without fluctuations) which is used to
calculate drop_probability */
if (!avg_dequeue_rate)
avg_dequeue_rate = dequeue_rate;
else
avg_dequeue_rate = 0.9 * avg_dequeue_rate + 0.1 * dequeue_rate;

/* store state */
enqueue_timestamp_prev = enqueue_timestamp;
cum_enqueued_bytes_prev = cum_enqueued_bytes;
qlen_prev = qlen;

return;
}
```

ADAPTING PROPORTIONAL INTEGRAL CONTROLLER ENHANCED ALGORITHM FOR VARYING NETWORK CONDITIONS IN A NETWORK ENVIRONMENT

CROSS-REFERENCE TO RELATED APPLICATION

This application is a continuation-in-part and claims the benefit of priority under 35 U.S.C. §120 to U.S. application Ser. No. 13/874,600, entitled "Utilizing Latency Control to Alleviate Bufferbloat" filed May 1, 2013. The disclosure of the prior application is considered part of, and is incorporated by reference in its entirety, in the disclosure of this Application.

TECHNICAL FIELD

This disclosure relates in general to the field of communications and, more particularly, to adapting Proportional Integral controller Enhanced (PIE) algorithm for varying network conditions in a network environment.

BACKGROUND

The field of communications has become increasingly important in today's society. One area of importance associated with network communications relates to network congestion. Network congestion can occur when a link or node is carrying so much data that its quality of service deteriorates, leading to packet loss and other undesirable network behavior. As traffic and subscriber base of end users increases, so too does network congestion, as more and more users cram higher amounts of traffic into existing network infrastructure. Studies show that overall data traffic is expected to double every year, leading to increasingly congested networks. Efficient management of communication sessions and data flows to avoid undesirable network behavior is thus increasingly important in networking technologies.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 6A and 6B are simplified graphs illustrating example details of an embodiment of the communication system;

FIGS. 7A and 7B are simplified graphs illustrating other example details of an embodiment of the communication system;

FIG. 11 is a simplified pseudo-code illustrating yet other example operations that may be associated with an embodiment of the communication system.

DETAILED DESCRIPTION OF EXAMPLE EMBODIMENTS

Overview

An example method for adapting PIE algorithm for varying network conditions in a network environment is provided and includes estimating an average dequeue rate at which packets are dequeued (e.g., remove, depart, etc.) from a queue of packets (e.g., a sequence of packets stored so as to be retrievable in a definite manner) maintained in a buffer in a network element operating in a network environment. The method can also include estimating a current queuing latency (e.g., delay experienced by a packet due to waiting in the queue) for the queue of packets based on the average dequeue rate, determining a target delay based on the average dequeue rate, the target delay varying with the average dequeue rate according to a predetermined relationship.

The method can also include calculating a current drop probability associated with a probability that packets arriving at the buffer will be dropped or marked, the current drop probability being calculated using at least the current queuing latency and the target delay. As used herein, the term "buffer" refers to a portion (e.g., area, component, part, fraction, etc.) of a memory element used for storing data (e.g., packets used in communication networks, for example, according to Internet Protocol (IP)) temporarily. Note that the term "drop probability" of a packet as used herein refers to a probability that the packet will be dropped or marked to communicate an end to end signal (e.g., signal originating in the network from a sender, carried (e.g., via Internet Protocol) to a receiver, and communicated by the receiver to the sender via another protocol (e.g., TCP), for example as implemented in explicit congestion notification (ECN)).

Example Embodiments

Figure 1:
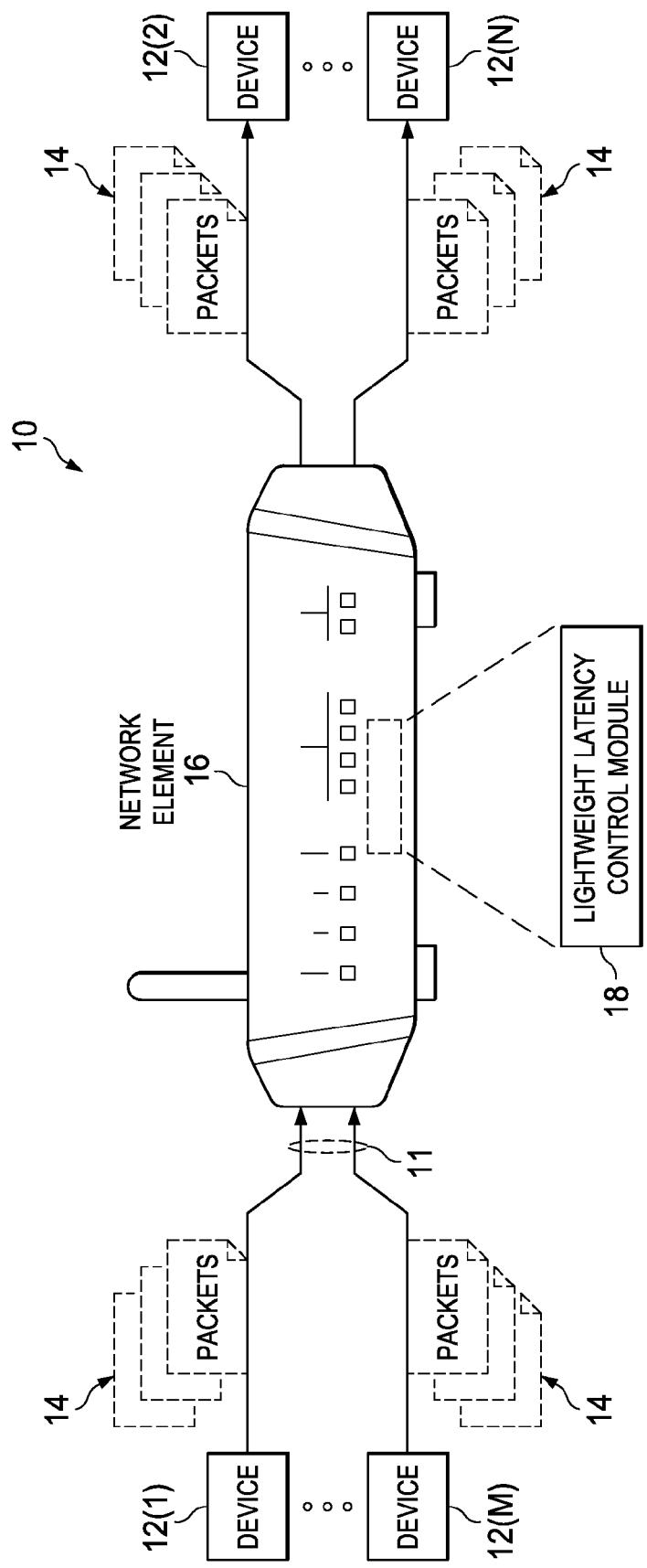
FIG. 1 is a simplified block diagram illustrating a communication system for adapting PIE algorithm for varying network conditions in a network environment.

Turning to FIG. 1, FIG. 1 is a simplified block diagram illustrating a communication system 10 for adapting PIE algorithm for varying network conditions in a network environment in accordance with one example embodiment. FIG. 1 illustrates a network 11 wherein devices 12(1)-12(N) communicate packets 14 through a network element 16 (e.g., router, switch, etc.), configured with a lightweight latency control module 18. According to various embodiments, lightweight latency control module 18 can execute a modified PIE algorithm to reduce excess buffering (also referred to as 'bufferbloat') of packets in network 11. The term "buffering" refers to the act of storing the data in one or more buffers. For example, lightweight latency control module 18 can adaptively drop or mark packets entering one or more buffers in network element 16 based on varying network conditions.

In various embodiments, lightweight latency control module 18 may be any suitable application, or suitably configured hardware component connected to, or in communication with network element 16, and capable of performing the operations described herein. In some embodiments, lightweight latency control module 18 can automatically tune certain PIE parameters based on observed network conditions. The adaptive tuning of parameters can eliminate or reduce manual configuration and avoid configuration errors, while simplifying ease of deployment and use on a wide variety of network conditions. In some other embodiments, lightweight latency control module 18 can use intelligent queue management schemes to control latency and jitter and provide differentiated services to different applications and users. For example, data from different applications may be treated differently to enhance user experience overall. In yet other embodiments, lightweight latency control module 18 can extend PIE with an enqueue based rate and delay estimation, for example, in platforms where dequeue based rate estimation cannot be implemented.

Devices 12(1)-12(N) can include any suitable network element that may communicate packets 14 between each other suitably. Examples of devices 12(1)-12(N) include computers, servers, etc. The term "network element" includes computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. A node is any electronic device (e.g., machine device or a mobile device), client, server, peer, service, application, or other object capable of sending, receiving, or forwarding information over communications channels in a network. Examples of network element 16 include Cisco® 12000 Internet Router, and Cisco Nexus® 7000 Switch. Note that network element 16 can include any device that imposes a queue, which include an originating system, a receiving system, and middleware (e.g., load balancers, firewalls, etc.) in the network.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Network elements often include buffers that obtain and effectively hold packets for a period of time before allowing the packets to be transmitted through a network, e.g., a packet-switched computer network. As will be appreciated by those skilled in the art, buffering generally reduces the likelihood that packets are dropped or lost, and allows for network bandwidth to be used efficiently. As the volume of network traffic increases, demands for buffering capabilities increases, resulting in increased size of buffers. As such, the volume (e.g., number, size) of packets that may be stored in the buffers may be excessive. Bufferbloat occurs when excess buffering of packets in the network cause high latency and jitter. Bufferbloat also causes overall network throughput to be compromised. High latency, jitter, and loss of overall network throughput generally have an adverse effect on the performance of the network. Bufferbloat may be caused by factors including, but not limited to, exponential growth of Internet traffic, ready availability of memory elements, and operational nature of the traffic.

Active queue management associated with the buffer may generally be implemented to alleviate issues associated with bufferbloat. For example, active queue management may involve executing a PIE algorithm configured to estimate a queuing latency or a delay, calculate a drop probability that any incoming packets will be dropped or marked based on an estimated queuing latency (e.g., time delay between arrival of a packet and departure of the packet from the buffer; in other words, the time delay experienced by the packet in the queue in the buffer), and control the queuing latency based on the drop probability that any packets will be dropped or marked. In a general sense, the PIE algorithm calculates the drop probability as follows:

$$\text{drop\_probability}(t) = \text{drop\_probability}(t-1) + \alpha^*(\text{queuing\_latency}(t) - \text{target\_delay}) + \beta^*(\text{queuing\_latency}(t) - \text{queuing\_latency}(t-1))$$

where drop_probability(t) is a drop probability at a current time interval "t", drop_probability(t−1) is the drop probability at a previous time interval "t−1", queuing_latency(t) is an estimated queuing latency during current time interval "t", queuing_latency(t−1) is an estimated queuing latency during previous time interval "t−1", target_delay is a reference value (e.g., a target for queuing latency), and $\alpha$ and $\beta$ are control parameters.

Values such as initial values may be set or otherwise tuned based on a control analysis. While control parameter "$\alpha$" and control parameter "$\beta$" may be constant values, it should be appreciated that control parameter "$\alpha$" and control parameter "$\beta$" may also vary as a function of congestion. An initial value of control parameter "$\alpha$" may be approximately 0.125 Hz and an initial value of control parameter "$\beta$" may be approximately 1.25 Hz, while target_delay may have a value of approximately twenty milliseconds (ms) when a packet arrival and departure rate is approximately ten megabits per second (Mbps), which reflects an acceptable queuing delay under congestion.

Queuing latency may be estimated from a queue length (queue_length) and an average dequeue rate (average_dequeue_rate, a measure of average rate of dequeuing of packets from the queue), where the average_dequeue_rate depends on a departure count (dq_count) during a measurement cycle. Note that in simple equipment, such as links connected to traditional WAN circuits, a direct multiplicative calculation can lead to an estimate of the queuing latency. In more complicated scenarios, for example, Link Access Procedure, Balanced (LAPB) network environment, a lossy link introduces variability; in a Wi-Fi network, channel acquisition processes can arbitrarily extend latency; in input-queued switches, switching fabrics, shared LANs, etc., the mean dequeue rate provides a measure of recent history of packets, which in turn facilitates estimating the queuing latency.

The average_dequeue_rate may be calculated when certain conditions are met (e.g., when queue_length exceeds a certain threshold (dq_threshold) at the start of the measurement cycle. Thus, if at least dq_threshold bytes of data have been dequeued, the PIE algorithm calculates a dequeue_rate based on how long it takes to dequeue dq_threshold bytes.

The average_dequeue_rate is then calculated from the current dequeue_rate (e.g., as an average over time).

By controlling the queuing latency, stability may be maintained with respect to the buffer across a variety of different traffic scenarios. In general, by controlling the queuing latency, issues associated with bufferbloat may be substantially minimized. Using PIE, queuing latency may be maintained at an acceptable or reference level regardless of congestion levels. For example, the queuing latency or delay of Transmission Control Protocol (TCP) and Stream Control Transmission Protocol (SCTP) traffic may be maintained at a relatively low level even as a number of flows increases, as well as under persistent congestion caused by non-responsive traffic. Unlike traditional active queue management schemes, such as random early detection (RED) algorithm that control queue length, PIE directly controls latency and improves quality of service to latency-sensitive applications without sacrificing link utilization.

Existing implementations of PIE generally involve manual configuration of certain PIE parameters, such as target_delay, dq_threshold, control parameter "α" and control parameter "β". Moreover, the calculation of the estimated time delay depends on a departure rate estimation, which in turn depends on a value of a threshold departure count. Such parameters are manually configured apriori, irrespective of actual network conditions. Varying network conditions can affect the accuracy of the drop probability calculations, to a certain extent. Additionally, a default value of target_delay may not result in optimal queue latency and quality of service for real-time applications. For example, 100 ms target_delay value can result in an unreasonably large standing queue when the outgoing rate is 1 Gbps, whereas the 100 ms default value may be reasonable for 1 Mbps links.

Communication system 10 is configured to address these issues (and others) in offering a system and method for adapting the PIE algorithm for varying network conditions in a network environment. Embodiments of communication system 10 may add at least two adaptive techniques by which two different PIE parameters are tuned based on observed network conditions. The adaptive techniques can improve PIE's performance under varying network conditions. A first example adaptive technique may tune PIE's target_delay parameter based on observed dequeue rate or based on the service level agreement (SLA) configured for a specific flow. A second adaptive technique may tune PIE's dq_threshold parameter based on network conditions.

According to embodiments of communication system 10, lightweight latency control module 18 may facilitate estimating an average dequeue rate (average_dequeue_rate) at which packets 14 are dequeued from a queue of packets maintained in a buffer in network element 16; estimating a current queuing latency (queuing_latency(t)) for the queue of packets based on the average dequeue rate; determining a target delay (target_delay) based on the average dequeue rate, the target delay varying with the average dequeue rate according to a predetermined relationship; and calculating a current drop probability (drop_probability) associated with a probability that packets 14 arriving at the buffer will be dropped or marked, the current drop probability being calculated using at least the current queuing latency and the target delay.

In specific embodiment, lightweight latency control module 18 may facilitate estimating a threshold (dq_threshold), which varies according to network conditions, for a number of bytes dequeued from the buffer. In addition, the average dequeue rate may be calculated if the number of bytes dequeued exceeds the threshold during a measurement cycle.

In various embodiments, adapting target_delay parameter for varying network condition can allow for smaller standing queues and delays when the outgoing bandwidth increases and vice-versa. According to an embodiment of communication system 10, the first adaptive technique may tune PIE's target_delay value based on the average_dequeue_rate. For example, if the observed average_dequeue_rate is around 100 Mbps, target_delay=5 ms; if the observed average_dequeue_rate is around 1 Gbps, target_delay=2 ms; in all other cases, target_delay may be set to a default initial value (e.g., input by a network administrator or other user apriori). The relationship between average_dequeue_rate and target_delay may be set heuristically in one embodiment; in other embodiments, the relationship between average_dequeue_rate and target_delay may be set based on simulations, mathematical relationships, or other mechanisms, as appropriate and based on suitable needs.

In situations where the outgoing link rate becomes small, it may take some considerable time to dequeue all dq_threshold bytes. For example, it could take 80 ms to dequeue a dq_threshold of 10000 bytes for a 1 Mbps link. In such a case, PIE cannot calculate a valid dequeue_rate sample in one measurement cycle (e.g. 30 ms). According to one embodiment, if a maximum link rate (maximum_link_rate) is known apriori (e.g., based on platform specifications, such as in cable modems like Data-over-Cable Service Interface Specification (DOCSIS) 3.0 or DOCSIS 3.1), dq_threshold may be set to an amount of bytes that can be dequeued in Media Access Control (MAC) latency (e.g., minimum latency incurred for medium access in the DOCSIS environment, usually 5-7 ms). MAC latency may be derived from a DOCSIS MAC layer, and may have a fixed value based on the platform and invariant with network conditions, in general. For example:

$$dq\_threshold = maximum\_link\_rate \times MAC\ latency$$

If the maximum link rate is not known apriori, and the outgoing link rate can vary to low values, dq_threshold may be reduced (e.g., halved) until it hits a few thousand bytes (e.g., a size of two average packets) in value:

if ((now-dq_start_timestamp)>threshold)
  {
  dq_threshold=dq_threshold/2;
  if (dq_threshold<2*average_packets_size)
  dq_threshold=2*average_packets_size;
  } where (now-dq_start_timestamp) indicates a time interval of the current measurement cycle, with dq_start_timestamp indicating a start timestamp of the current measurement cycle, and now indicating the current time. Note that dq_threshold can be reduced in any suitable manner, and not merely in a geometric progression manner, as in the example described herein.

In some embodiments, for example, in cable modem environments, wherein a cable modem termination system (CMTS) owns (e.g., controls, communicates with, etc.) a Upstream scheduler (US scheduler) through which it controls bandwidth allocation, the CMTS can embed an explicit notification of congestion that can be sent to substantially all the cable modems in the network. For example, a MAC domain descriptor (MDD) message may be used for purposes of notifying about congestion. In another example, other point-to-multipoint system may use other mechanisms to communicate the congestion information.

The CMTS may also send a per-flow congestion notification based on individual flow conditions. For example, per-flow congestion notification based on individual flow conditions may be embedded in a periodic cable model control (CM-CNTRL) message; other mechanisms and message protocols may also be used within the broad scope of the embodiments. The explicit congestion notifications from the CMTS scheduler (or other schedulers for other access media) can be either used as an audit mechanism (e.g., to ensure accurate calculation of average_dequeue_rate or to calibrate the rate estimation in a suitable manner).

According to some embodiments, weight functions may be introduced into the drop_probability calculations. For example, a generic drop_probability (e.g., according to PIE) may be calculated initially. The drop_probability may be modified for individual classes of traffic according to respective weights assigned to the individual classes. For example:

drop_probability($i$)=drop_probability/weight($i$)

where i represents an individual class of traffic, and weight (i) represents a weight (e.g., a numerical value) assigned to the class i. In some embodiments, if a specific class of traffic has highest priority, the drop_probability can be set to zero for the specific class of traffic. Thus, packets belonging to the specific class of traffic may not experience any drops (or marks) from the PIE algorithm calculations.

As used herein, the term "class of traffic" may include a classification of a packet based on any suitable classification mechanism. For example, the CoS may include eight (or more) different classes of services as provided in IEEE 802.1p specifications and can be expressed through a 3-bit prioritization field in a packet header. In another example, incoming packets 14 may be classified based on one or more values (e.g., quality control parameters, source address, destination address, etc.) extracted from the packets to identify a corresponding CoS associated with the packets. Each CoS may have an identifier associated therewith. A predetermined weight may be assigned to each CoS, based on suitable needs.

Depending on the weights that are assigned to different classes of traffic, the drop_probability may be different for each class. For example, the higher the weight (e.g., more important traffic), the less is the drop_probability. In special cases, random dropping (or marking) may be bypassed for a high priority class. Using such mechanisms, differentiated services to different applications or users may be achieved without complicated scheduling methods like fair queuing (FQ). For example, Voice over IP (VOIP) traffic may be treated as a special class, whereby the VOIP packets are not dropped or marked, and its quality of service can be guaranteed. In another example, the weight of gaming traffic may be set to 10 relative to a weight of 1 for regular file transfer protocol (FTP) traffic. Thus, the gaming traffic may experience only 10% of the drops that a normal FTP flow may experience due to PIE, thereby potentially minimizing an impact of the FTP traffic low on the gaming traffic flow. In yet another example, different weights can be assigned to different users based on respective SLAs. Premium users may be assigned higher weights, with consequently better quality of service (e.g., fewer packet drops). In one example embodiment, classification of flows can be performed in a manner similar to (or same as) weighted random early detection (WRED).

According to an embodiment of communication system 10, queuing latency calculations may be based on enqueuing of packets, rather than dequeuing. On some platforms, where access or visibility into the dequeue functionality may be limited or non-existent, an enqueue-based rate and delay estimation algorithm may be executed, as follows. Appropriate hooks in an enqueue interface arrangement may permit retrieval (e.g., determination, measurement, etc.) of a most recent packet enqueued time (enqueue_timestamp) and a cumulative number of enqueued bytes, excluding dropped bytes (cum_enqueued_bytes) at configurable intervals. The dequeue_rate may be calculated based on the enqueue_timestamp and cum_enqueued_bytes as follows. Parameters (e.g., delta_enqueued_bytes, delta_dequeued_bytes, dequeue_rate) used in the calculation may be initialized (e.g., set to zero). A determination may be made whether a reasonably minimal (e.g., 0.01 s) has elapsed since a last update of the calculations.

A determination may be made whether the queue is not empty (e.g., as determined from a value of a flag) and the queue length is of reasonable size (e.g., queue_length more than 3500 bytes). If the queue is empty, or too small, a current measurement cycle may be bypassed and a state of the queue and measurement cycle may be stored (e.g., a parameter enqueue_timestamp_prev to set a previous measurement cycle may be set to the current enqueue_timestamp; a cumulative number of previously enqueued bytes, cum_enqueued_bytes_prev, may be set to the currently measured cumulative enqueued bytes (cum_enqueued_bytes); a previous value of queue length (qlen_prev) may be set to a current value of queue length (qlen); and the flag to signify an empty queue may be set (e.g., to 0)).

In the current measurement cycle, a number of enqueued bytes may be determined as a difference between the measured number of cumulative enqueued bytes in the current measurement cycle and the previous measurement cycle (e.g., delta_enqueued_bytes=cum_enqueued_bytes−cum_enqueued_bytes_prev). It follows therefore, that the number of dequeued bytes in the current measurement cycle is a sum of a change in the queue length between the previous and current measurement cycles and the number of enqueued bytes in the current measurement cycle (e.g., delta_dequeued_bytes=qlen_prev−qlen+delta_enqueued_bytes). The dequeue_rate may be calculated as a rate of change of dequeued bytes in the current measurement cycle (e.g., dequeue_rate=delta_dequeued_bytes/(enqueue_timestamp−enqueue_timestamp_prev)).

An average dequeue rate (e.g., averaged over time to discount rapid fluctuations and to ensure a gradual change) may be used to estimate queuing latency (e.g., queuing delay). The average dequeue rate may be initialized (e.g., to the currently calculated dequeue rate) before being used in the calculations. A new average dequeue rate may be calculated and stored based on the historic average dequeue rate (e.g., avg_dequeue_rate=0.9*avg_dequeue_rate+0.1*dequeue_rate).

Turning to the infrastructure of communication system 10, the network topology can include any number of servers, hardware accelerators, virtual machines, switches (including distributed virtual switches), routers, and other nodes interconnected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Figure 2:
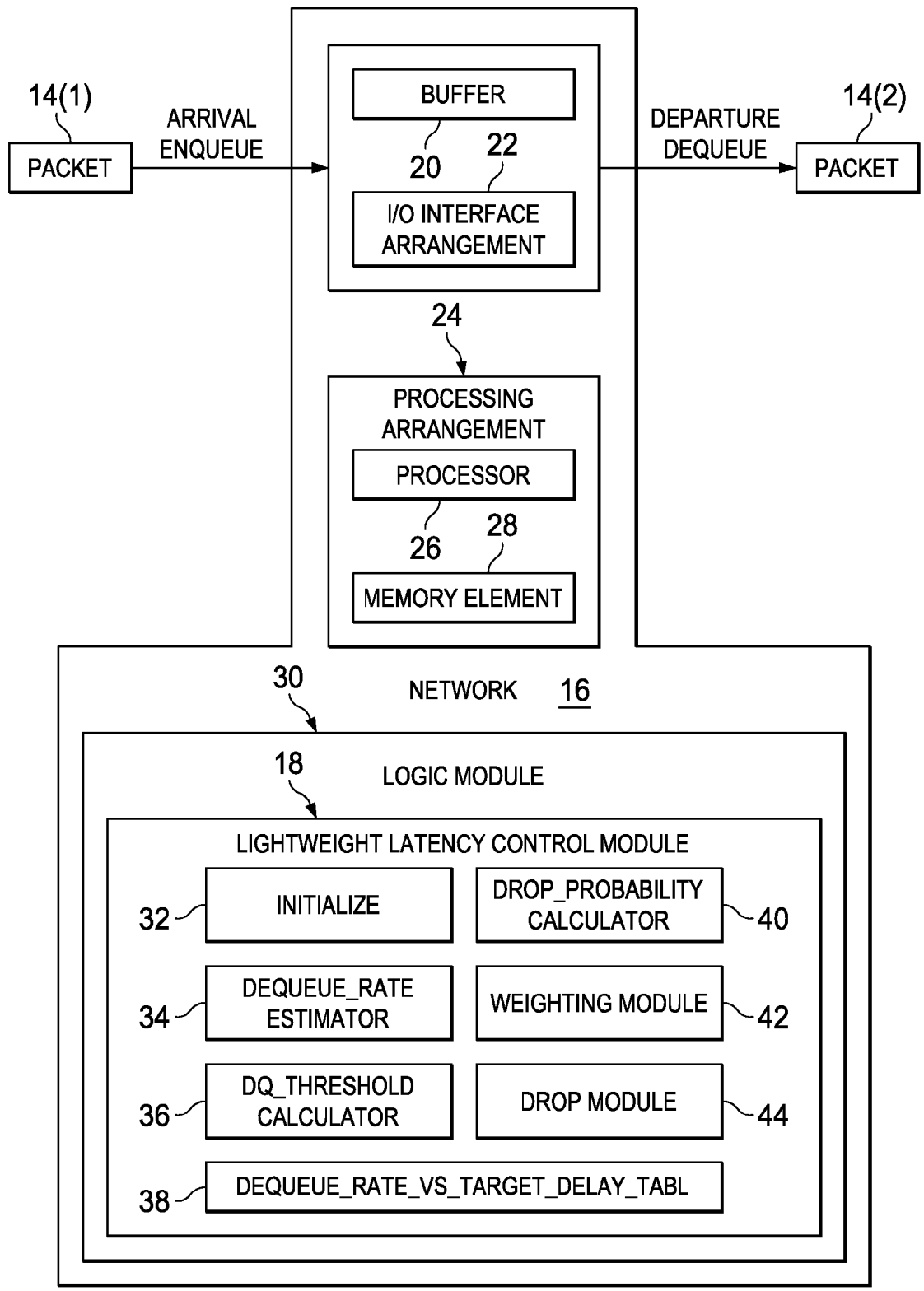
FIG. 2 is a simplified block diagram illustrating example details of an embodiment of the communication system.

Turning to FIG. 2, FIG. 2 is a simplified block diagram illustrating example details of an embodiment of communication system 10. Network element 16 generally includes a buffer 20, into which input packet 14(1) obtained by I/O interface arrangement 22, e.g., by an input port of I/O interface arrangement 22, may be held, or queued and dequeued from as output packet 14(2). Network element 16 also includes a processing arrangement 24, comprising a processor 26 and a memory element 28. A logic module 30 may include any suitable combination of hardware, firmware, and software. Processing arrangement 24 is generally configured to execute substantially any software logic included in logic module 30.

Logic module 30 includes lightweight latency control module 18. Lightweight latency control module 18 generally includes hardware and/or software logic configured to effectively control congestion and a queuing latency associated with buffer 20. Lightweight latency control module 18 is generally arranged to monitor buffer 20, to estimate a queuing latency associated with buffer 20, and to calculate or otherwise determine a drop probability for packets contained within buffer 20. Using information relating to a drop probability, the queuing latency may be controlled or effectively maintained at a desired level such that congestion associated with buffer 20, as well as network 11, may be substantially controlled.

Lightweight latency control module 18 includes at least an initialize module 32, which can initialize parameters related to the congestion control algorithms described herein; a dequeue_rate estimator 34, which can calculate the average_dequeue_rate, a dq_threshold calculator 36, which can calculate the dq_threshold parameter, a dequeue_rate_vs_target_delay_table 38, which comprises an association between average_dequeue_rate and target_delay parameters, for example, as a heuristic relationship wherein target_delay decreases with increasing average_dequeue_rate, or any other suitable relationship; a drop_probability calculator 40, which can calculate drop_probability to enable congestion reduction; a weighting module 42, which can retrieve weights pre-assigned to classes of traffic; and a drop module 44, which can facilitate dropping (and/or marking) input packet 14(1) instead of storing it in buffer 20, based on a value of drop_probability calculated by drop_probability calculator 40.

In some embodiments, lightweight latency control module 18 may monitor the departure of output packet 14(2), and calculate average_dequeue_rate, queuing_latency, and other parameters therefrom. In other embodiments, lightweight latency control module 18 may monitor the arrival of input packet 14(1), and calculate average_dequeue_rate, queuing_latency, and other parameters therefrom.

Figure 3:
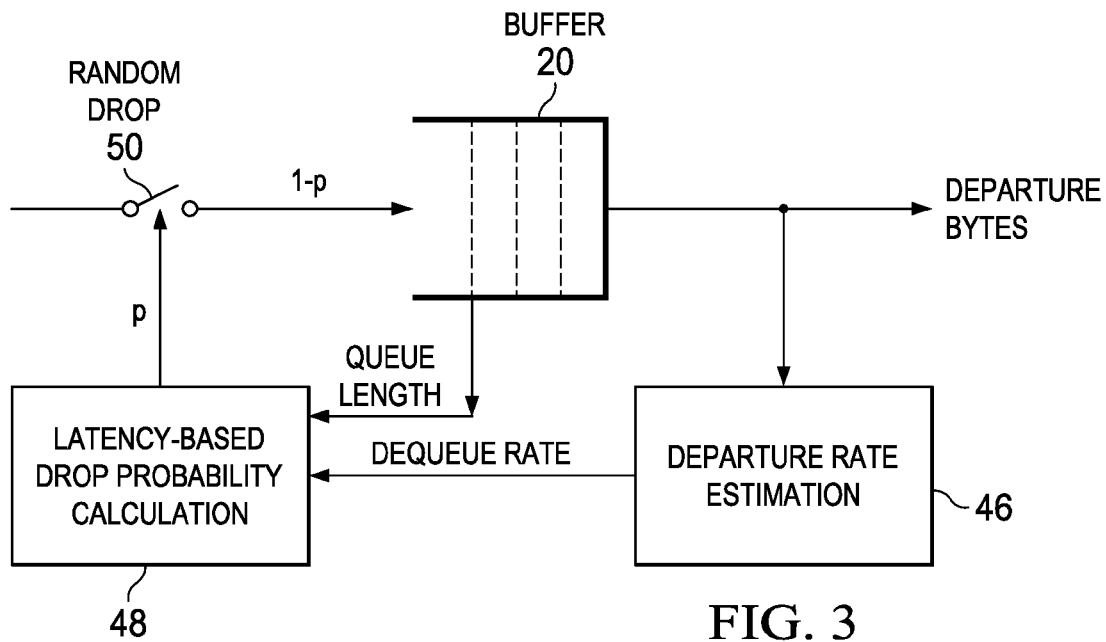
FIG. 3 is a simplified block diagram illustrating yet other example details of an embodiment of the communication system.

Turning to FIG. 3, FIG. 3 is a simplified block diagram illustrating example details of an embodiment of communication system 10. In a general sense, information relating to the drop probability is used by an overall control system to control congestion within buffer 20. Using the drop probability, which is an indicator of the likelihood that packet 14 may be dropped (or marked) on arrival, latency may be controlled. Buffer congestion may be controlled efficiently, e.g., maintained at an acceptable level or reference level, using the drop probability. Buffer 20 may be controlled by a module or arrangement that includes a buffer manager for controlling packet arrivals and departures from buffer 20. Within network element 16, buffer 20 may enqueue packets 14 (e.g., capture, store, etc. packets 14 on arrival), maintain a queue of packets 14, and dequeue packets 14 (e.g., facilitate sending out packets 14). Information relating to packets which are dequeued, e.g., information relating to bytes departing buffer 20 may be provided to a departure rate estimation 46 of a PIE structure. The dequeue_rate estimated by departure rate estimation 46 may be provided to a latency based drop probability calculation 48 of the PIE structure. Latency based drop probability calculation 48 may also obtain a queue length associated with buffer 20 and calculate a drop probability using the estimated dequeue_rate and queue length (qlen). Based on the calculated drop_probability p, the incoming packets to buffer 20 may be subjected to a random drop 50.

Although only a few embodiments have been described in this disclosure, it should be understood that the disclosure may be embodied in many other specific forms without departing from the spirit or the scope of the present disclosure. By way of example, while a short-term packet burst generally will not significantly affect a drop probability, a burst allowance may be added into the PIE implementation or structure. In one embodiment, a burst allowance may be defined such that when the burst allowance is above zero, a packet that is incoming to buffer 20 may be enqueued such that a random drop process may effectively be bypassed. Each time a drop probability is updated, the value of the burst allowance, which may be initialized to a configurable maximum value, may be decremented by an update period. That is, a burst allowance may be initialized to a substantially maximum burst value.

Figure 4:
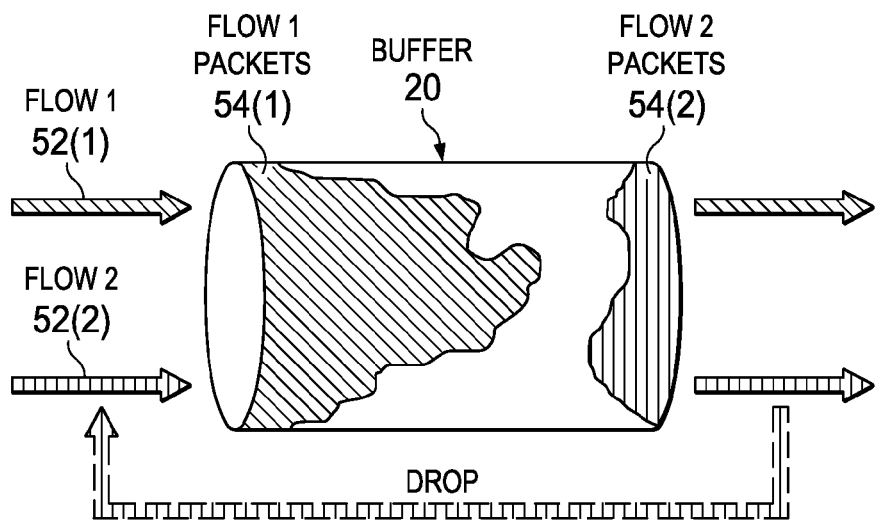
FIG. 4 is a simplified block diagram illustrating yet other example details of an embodiment of the communication system.

Turning to FIG. 4, FIG. 4 is a simplified block diagram illustrating example details of buffer 20 according to an embodiment of communication system 10. Packets belonging to flows 52(1) and 52(2) may arrive at buffer 20 and may be stored therein. The term "flow" can be inclusive of a stream of packets. Substantially all packets belonging to a specific flow may have a set of common properties. Each property can be a result of applying a function to one or more packet header fields (e.g., destination IP address), transport header fields (e.g., destination port number), or application header fields (e.g., real-time protocol (RTP) header fields; one or more characteristics of the packet (e.g., number of multiprotocol label switching (MPLS) labels); or one or more fields derived from packet treatment (e.g., next hop IP address, output interface). A packet may be characterized as belonging to a particular flow if it satisfies substantially all properties of that flow. For example, packets with the same source-destination addresses may belong to a specific flow. Packets belonging to flow 52(1) may be stored as 54(1); packets belonging to flow 52(2) may be stored as 54(2) in buffer 20. In an example embodiment, the number of packets 54(1) and 54(2) in buffer 20 may be maintained at respective particular values, irrespective of the arrival and departure rates, for example, by dropping packets at arrival based on drop probabilities; in another embodiment, the time spent by packets 54(1) and 54(2) in buffer 20 may be maintained at respective particular values, irrespective of the arrival and departure rates, for example, by dropping packets at arrival based on drop probabilities.

Figure 5:
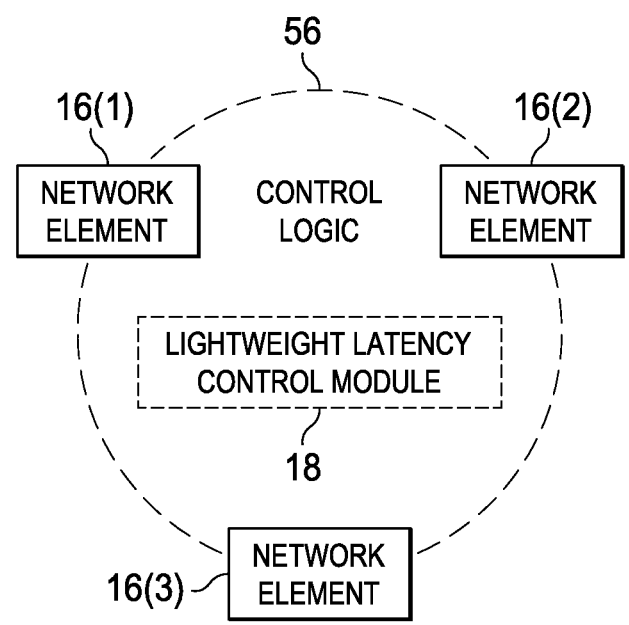
FIG. 5 is a simplified block diagram illustrating yet other example details of an embodiment of the communication system.

Turning to FIG. 5, FIG. 5 is a simplified block diagram illustrating an example network in which a control system that is configured to provide congestion control and lightweight latency control is distributed throughout the network in accordance with an embodiment of communication system 10. The network may include multiple network elements 16(1)-16(3), e.g., routers and/or switches that are in communication with each other. Overall control logic 56 may be generally arranged to control the flow of packets within the network, and may be distributed such that portions of control logic 56 are associated with each network element 16(1)-16(3). As such, lightweight latency control module 18, which is included in overall control logic 56, as well as control logic 56 itself, may be effectively distributed among network elements 16(1)-16(3). In one embodiment, control logic 56 may be substantially programmable such that an application may effectively set parameters, e.g., a delay reference, through the use of an application programming interface (API).

Turning to FIGS. 6A and 6B, FIGS. 6A and 6B are example graphs indicating the effect of adding weighting functions to drop probability calculations according to an example embodiment of communication system 10. Four classes of traffic, represented by Classes 0, 1, 2 and 3 may be associated with different users, or applications, protocols (e.g., TCP, UDP, etc.) or other suitable metric. The flows of the different classes of traffic may be simulated using any suitable network simulation tool, and the drop probability calculated over time. FIG. 6A illustrates graph 60, showing the drop probability varying over time (e.g., simulation time) for the case where each class of traffic has the same weight assigned thereto (or alternatively, the case where no separate weights are assigned to the different classes of traffic). Lines 61(0)-61(3) represent the drop probability for classes 0-3 respectively. As is evident from the graph, the drop probabilities for each class is roughly the same as the others.

FIG. 6B illustrates graph 62, showing the case where each class of traffic may have different weights pre-assigned to them, for example, by a network administrator. Class 0 may have the highest priority (and the most weight), and class 2 may have the lowest priority (and the least weight). Lines 63(0)-63(3) represent the drop probability for classes 0-3 respectively. In the example illustrated, the higher the weight, the lower is the drop probability. Thus, drop probabilities for class 3, represented by line 63(3) indicates the highest values; whereas drop probabilities for class 0, represented by line 63(0) indicates the lowest values.

Figure 7A:
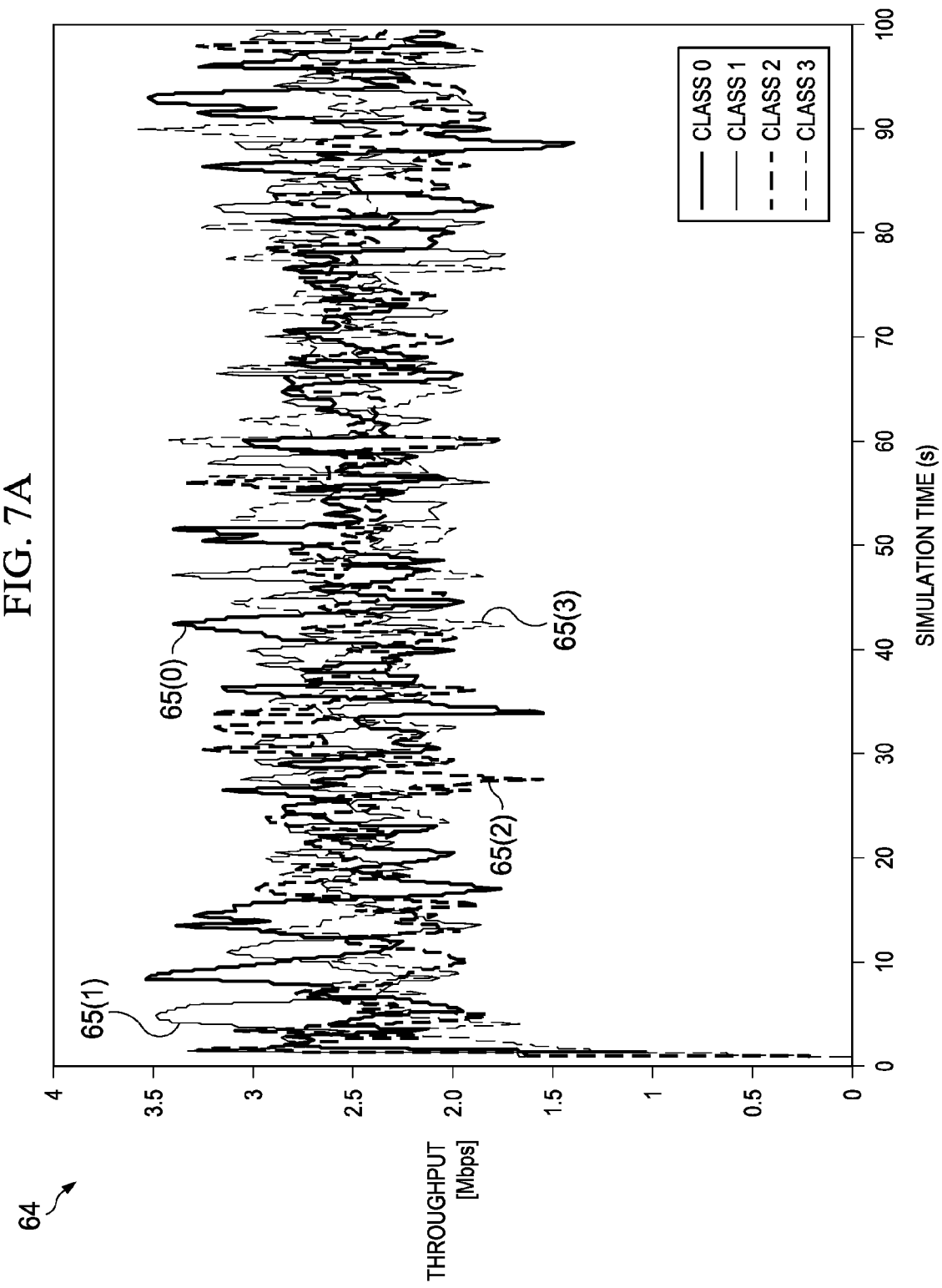

Turning to FIGS. 7A-7B, FIGS. 7A and 7B are example graphs indicating the effect of adding weighting functions to drop probability calculations affecting throughput according to an example embodiment of communication system 10. In a general sense, throughput and drop probability have an inverse relationship; higher drop probability results in lower throughput (e.g., because more packets are dropped). FIG. 7A illustrates graph 64, showing the throughput varying over time (e.g., simulation time) for the case where each class of traffic has the same weight assigned thereto (or alternatively, the case where no separate weights are assigned to the different classes of traffic). Lines 65(0)-65(3) represent the throughput for classes 0-3 respectively, determined from simulations. As is evident from the graph, the throughput for each class is roughly the same as the others.

FIG. 7B illustrates graph 66, showing the case where each class of traffic may have different weights pre-assigned to them, for example, by a network administrator. Lines 67(0)-67(3) represent the throughput for classes 0-3 respectively. In the example illustrated, the higher the weight, the lower is the drop probability; hence higher is the throughput. Thus, throughput for class 3, represented by line 67(3) indicates the lowest values; whereas drop probabilities for class 0, represented by line 67(0) indicates the highest values.

Figure 8:
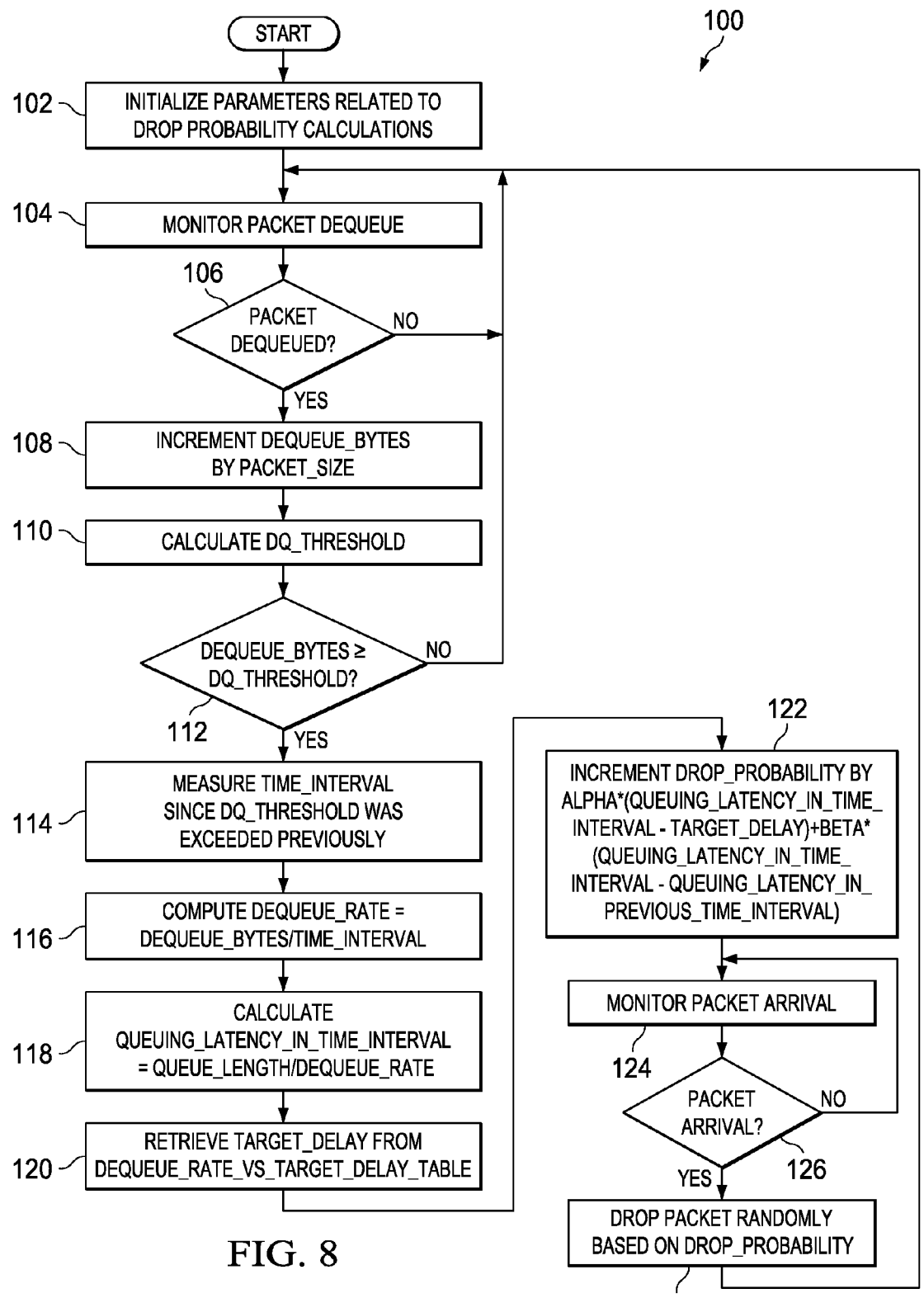
FIG. 8 is a simplified flow diagram illustrating example operations that may be associated with an embodiment of the communication system.

Turning to FIG. 8, FIG. 8 is a simplified flow diagram illustrating example operations 100 that may be associated with calculating drop probability according to an embodiment of communication system 10. At 102, parameters related to drop probability calculations may be initialized. For example, initial values of control parameters $\alpha$, $\beta$, time variable/counter, etc., may be initialized. At 104, packet dequeue may be monitored, for example, a hook may be placed in a function call that pulls the packet from the queue and sends it over a physical wire (or other suitable communication channel). At 106, a determination may be made whether a packet has dequeued. If not, the operations loop back to 104. If a packet has dequeued, at 108, variable dequeue_bytes that maintains a count (or size) of dequeued packets may be incremented (over a previously computed value) by the packet size (e.g., of the packet that was dequeued).

At 110, parameter dq_threshold may be calculated according to various methods described herein. For example, dq_threshold may be calculated as a function of the network conditions supported by the network element and its other capabilities (e.g., maximum link rate and MAC latency). In another example, dq_threshold may be calculated as an arbitrary number that permits estimation of the dequeue_rate in a reasonable time interval. At 112, a determination may be made whether dequeue_bytes is larger than or equal to dq_threshold. If not, the operations may loop back to 104. If dequeue_bytes is larger than or equal to dq_threshold, at 114, the time interval since dq_threshold was previously exceeded may be measured.

The measurement provides an indication of the current measurement cycle. For example, when dequeue_bytes is larger than or equal to dq_threshold, the current measurement cycle may be started. It may terminate a next time dequeue_bytes is larger than or equal to dq_threshold. It should be appreciated that the measurement cycle is generally a period of time over which the dequeuing rate is estimated. The current measurement cycle may generally begin when a certain number of packets is identified in a queue, and may generally end when an appropriate condition is met (e.g., when dequeue_bytes crosses dq_threshold). In one embodiment, when dequeue_bytes crosses dq_threshold, average_dequeue_rate may be estimated. It should be appreciated that once the current measurement cycle ends, a new measurement cycle may begin upon a certain number of packets being identified in the queue.

At 116, dequeue_rate may be calculated as a ratio of dequeue_bytes over the time interval of the current measurement cycle. At 118, the queuing latency in the current measurement cycle (queuing_latency_in_time_interval) may be calculated as a ratio of the queue length (queue_length) and dequeue_rate. At 120, the value of parameter target_delay may be retrieved from dequeue_rate_vs_target_delay_table 38. At 122, value of drop_probability may be incremented (over the value calculated in the previous measurement cycle) by $\alpha$*(queuing_latency_in_time_interval−target_delay)+$\beta$*(queuing_latency_in_time_interval−queuing_latency_in_previous_time_interval). At 124, packet arrival may be monitored. At 126, a determination may be made whether a packet has arrived. At 128, the packet may be randomly dropped (or not dropped) according to the drop_probability computed at 122. The operations may loop back to 104.

Figure 9:
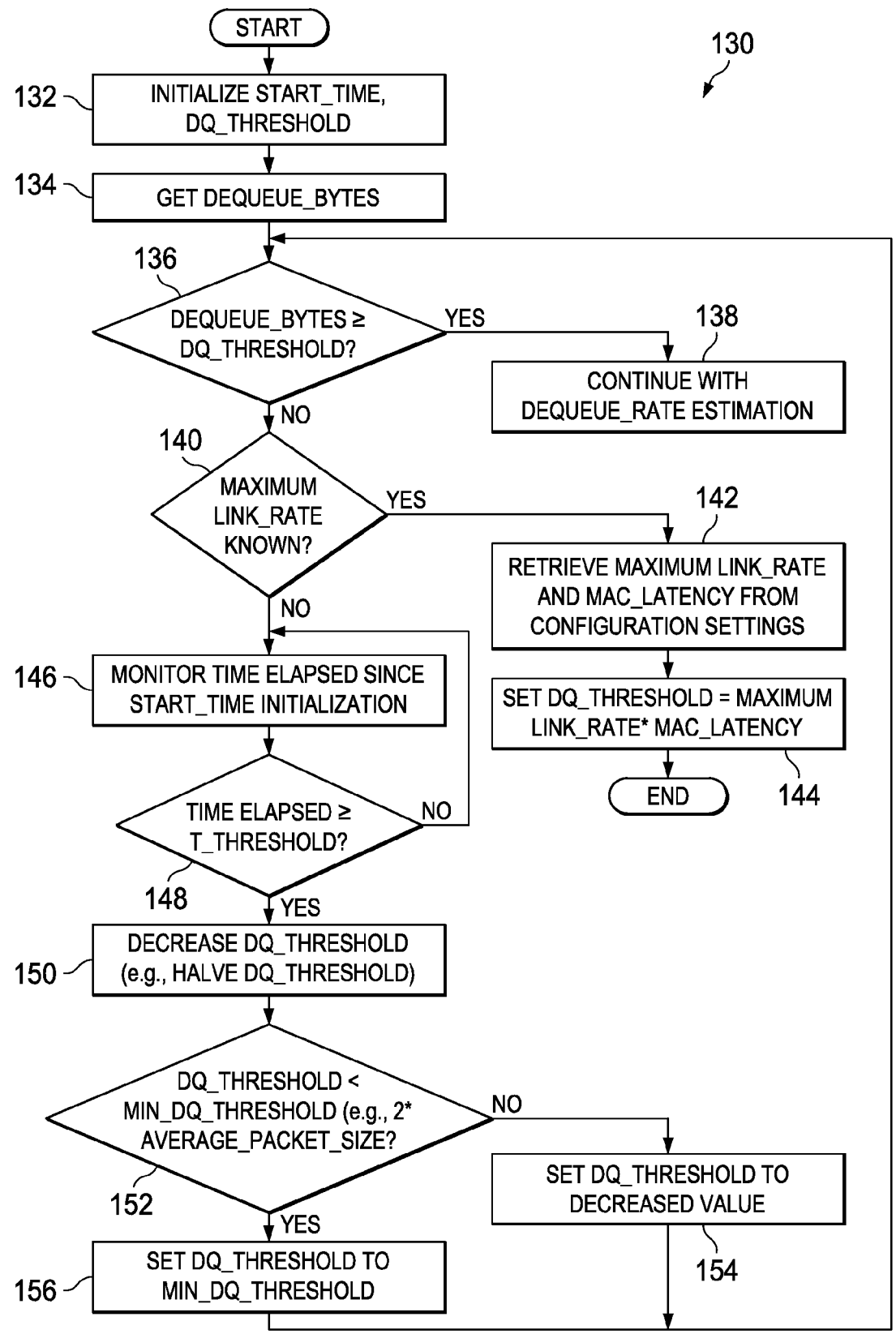
FIG. 9 is a simplified flow diagram illustrating other example operations that may be associated with an embodiment of the communication system.

Turning to FIG. 9, FIG. 9 is a simplified flow diagram illustrating example operations 130 that may be associated with calculating dq_threshold according to an embodiment of communication system 10. At 132, parameters, such as start_time (indicating a start of the current measurement cycle) and an arbitrary large, initialized value of dq_threshold may be set. At 134, dequeue_bytes may be retrieved from calculations according to operations 100. At 136, a determination may be made whether dequeue_bytes is larger than or equal to dq_threshold. If dequeue_bytes is larger than or equal to dq_threshold, the operations can continue with dequeue_rate estimation according to operations 100 as described previously herein.

If dequeue_bytes is not larger than or equal to dq_threshold, at 140, a determination may be made whether the maximum link rate for network element 16 is known. For example, if network element 16 is a CMTS, the maximum link rate may be provided in the relevant DOCSIS specification. If the maximum link rate is known, at 142, the maximum link rate and MAC latency may be retrieved from the appropriate configuration settings. At 144, dq_threshold may be set to be a product of the maximum link rate and the MAC latency.

If the maximum link rate is not known, at 146, the time elapsed since start_time initialization may be monitored (e.g., measured), for example, to determine a size of the current measurement cycle. At 148, a determination may be made whether the time elapsed is larger than a predetermined time threshold (t_threshold). If the time elapsed is not larger than the predetermined time threshold, the operations may loop back to 146 to continue to monitor the time. If the time elapsed is larger than the predetermined time threshold, at 150 (because dequeue_bytes is not larger than the current value of dq_threshold, thereby preventing estimation of the dequeue_rate), the current value of dq_threshold may be reduced (e.g., halved).

At 152, a determination may be made whether the decreased value of dq_threshold is less than a predetermined minimum value (min_dq_threshold). For example, a minimum value of dq_threshold may be set at 2 times an average packet size. Thus, in an example scenario, when dq_threshold is at its minimum value, dequeue rate estimation may be performed each time two packets are dequeued. If the decreased value of dq_threshold is not less than the predetermined minimum value, at 154, the current value of dq_threshold may be set to the decreased value. The operations may loop back to 136. If the decreased value of dq_threshold is less than the predetermined minimum value, the current value of dq_threshold may be set to the predetermined minimum value, and the operations may loop back to 136.

Figure 10:
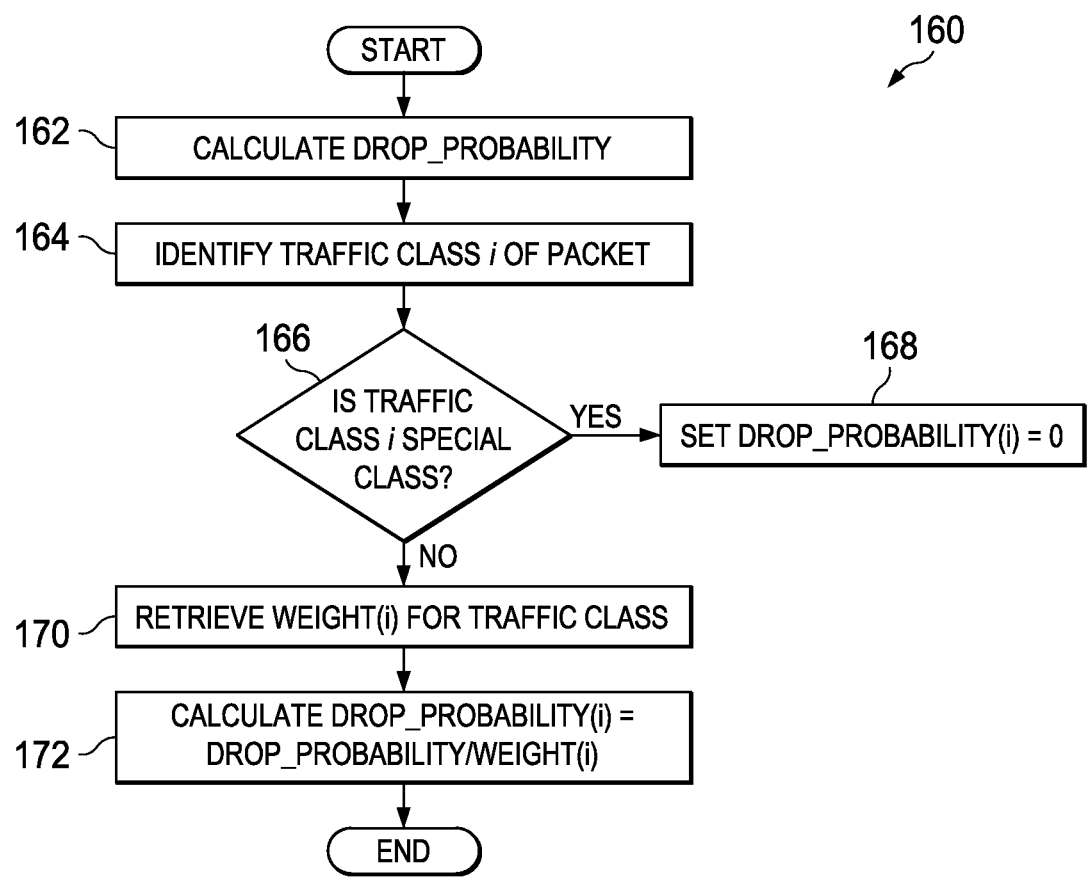
FIG. 10 is a simplified flow diagram illustrating yet other example operations that may be associated with an embodiment of the communication system.

Turning to FIG. 10, FIG. 10 is a simplified flow diagram, illustrating example operations 160 that may be associated with introducing weighting functions into drop probability calculations according to an embodiment of communication system 10. At 162, drop_probability may be calculated, for example, according to operations 100 described previously herein. At 164, a class "i" of traffic may be identified (e.g., from appropriate packet headers, configuration settings, etc.). At 166, a determination may be made whether class i is a special class. If class i is a special class, at 168, drop_probability for class i, namely drop_probability(i) may be set to 0 (e.g., no packets belonging to class i will be dropped). If class i is not a special class, at 170, the pre-assigned weight for class i may be retrieved. At 172, drop_probability may be modified by the weight, for example, drop_probability(i)=drop_probability/weight(i).

Turning to FIG. 11, FIG. 11 is a simplified diagram illustrating pseudo-code 180 that may be associated with calculating an average dequeue rate based on packet enqueue according to an embodiment of communication system 10. Parameters (e.g., delta_enqueued_bytes, delta_dequeued_bytes, dequeue_rate) used in the calculation may be initialized (e.g., set to zero). A determination may be made whether a reasonably minimal (e.g., 0.01 s) has elapsed since a last update of the calculations. A determination may be made whether the queue is not empty (e.g., as determined from a value of a flag) and the queue length is of reasonable size (e.g., queue_length more than 3500 bytes). If the queue is empty, or too small, a current measurement cycle may be bypassed and a state of the queue and measurement cycle may be stored (e.g., a parameter enqueue_timestamp_prev to set a previous measurement cycle may be set to the current enqueue_timestamp; a cumulative number of previously enqueued bytes, cum_enqueued_bytes_prev, may be set to the currently measured cumulative enqueued bytes (cum_enqueued_bytes); a previous value of queue length (qlen_prev) may be set to a current value of queue length (qlen); and the flag to signify an empty queue may be set (e.g., to 0)).

In the current measurement cycle, a number of enqueued bytes may be determined as a difference between the measured number of cumulative enqueued bytes in the current measurement cycle and the previous measurement cycle (e.g., delta_enqueued_bytes=cum_enqueued_bytes−cum_enqueued_bytes_prev). It follows therefore, that the number of dequeued bytes in the current measurement cycle is a sum of a change in the queue length between the previous and current measurement cycles and the number of enqueued bytes in the current measurement cycle (e.g., delta_dequeued_bytes=qlen_prev−qlen+delta_enqueued_bytes). The dequeue_rate may be calculated as a rate of change of dequeued bytes in the current measurement cycle (e.g., dequeue_rate=delta_dequeued_bytes/(enqueue_timestamp−enqueue_timestamp_prev)).

An average dequeue rate (e.g., averaged over time to discount rapid fluctuations and to ensure a gradual change) may be used to estimate queuing latency (e.g., queuing delay). The average dequeue rate may be initialized (e.g., to the currently calculated dequeue rate) before being used in the calculations. A new average dequeue rate may be calculated and stored based on the historic average dequeue rate (e.g., avg_dequeue_rate=0.9*avg_dequeue_rate+0.1*dequeue_rate).

Note that the operations described herein may also be used with ECN, for example, having different thresholds for ECN marking compared to dropping, and other edge scenarios. In a general sense, ECN allows end-to-end notification of network congestion without dropping packets. When ECN is successfully negotiated, an ECN-aware router may set a mark in an IP header of a packet instead of dropping the packet to signal impending congestion. The drop probability calculations described herein may be implemented at the ECN-aware router to calculate a probability of marking the packet (instead of dropping the packet on arrival). Moreover, note that the drop probability operations described herein may be used to mark packets for various network conditions and other reasons, including congestion notification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, lightweight latency control module 18. In some embodiments, one or more of these features may be implemented in hardware, provided external to these elements, or consolidated in any appropriate manner to achieve the intended functionality. The various network elements (e.g., lightweight latency control module 18) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, lightweight latency control module 18 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 28) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 26) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executed at a network element, comprising:
    determining if a threshold number of bytes of packets are dequeued from a queue of packets maintained in a buffer in the network element, wherein the packets are dequeued as they depart from the network element, wherein the threshold number of bytes of packets is calculated according to network conditions and network platform;
    estimating an average dequeue rate based on a time taken to dequeue the threshold number of bytes of packets during a measurement cycle;
    estimating a current queuing latency for the queue of packets based on the estimated average dequeue rate;
    determining a target delay based on the estimated average dequeue rate, wherein the target delay varies with the average dequeue rate according to a predetermined relationship, wherein determining the target delay comprises looking up a table representative of the predetermined relationship, wherein according to the predetermined relationship the target delay decreases with increasing average dequeue rate;
    calculating a current drop probability associated with a probability that packets arriving at the buffer will be dropped or marked, wherein the current drop probability is calculated using at least the estimated current queuing latency and the target delay looked up from the table; and
    dropping an arrived packet at the buffer according to the calculated drop probability.

2. The method of claim 1, wherein the average dequeue rate is estimated when a queue length at the buffer exceeds the threshold number of bytes of packets at a start of the measurement cycle.

3. The method of claim 2, wherein the threshold number of bytes of packets is calculated as a product of maximum outgoing link rate in the network and a Media Access Control (MAC) latency of the network element.

4. The method of claim 2, wherein calculating the threshold number of bytes of packets comprises:
    measuring time elapsed since initialization of the average dequeue rate estimation; and
    if the time elapsed is longer than a predetermined limit, decreasing the threshold number of bytes of packets until a minimum value is reached.

5. The method of claim 4, wherein the minimum value is substantially equal to two times an average packet size.

6. The method of claim 1, further comprising modifying the drop probability according to a weight of a class of traffic, wherein each class of traffic is assigned a different weight based at least on priority of the class of traffic.

7. The method of claim 6, wherein the drop probability is set to zero for a special class of traffic with a highest priority.

8. The method of claim 1, wherein the average dequeue rate is estimated based on monitoring packet arrival at the buffer.

9. The method of claim 8, wherein the average dequeue rate is calculated as a time averaged of a dequeue rate, wherein the dequeue rate is calculated based on a difference in a number of packet arrivals during the measurement cycle, a change in queue length, and time elapsed during the measurement cycle.

10. Non-transitory tangible media that includes instructions for execution, which when executed by a processor at a network element, is operable to perform operations comprising:
    determining if a threshold number of bytes of packets are dequeued from a queue of packets maintained in a buffer in the network element, wherein the packets are dequeued as they depart from the network element, wherein the threshold number of bytes of packets is calculated according to network conditions and network platform;
    estimating an average dequeue rate based on a time taken to dequeue the threshold number of bytes of packets during a measurement cycle;
    estimating a current queuing latency for the queue of packets based on the estimated average dequeue rate;
    determining a target delay based on the estimated average dequeue rate, wherein the target delay varies with the average dequeue rate according to a predetermined relationship, wherein determining the target delay comprises looking up a table representative of the predetermined relationship, wherein according to the predetermined relationship the target delay decreases with increasing average dequeue rate;
    calculating a current drop probability associated with a probability that packets arriving at the buffer will be dropped or marked, wherein the current drop probability is calculated using at least the estimated current queuing latency and the target delay; and
    dropping an arrived packet at the buffer according to the calculated drop probability.

11. The media of claim 10, wherein the average dequeue rate is estimated when a queue length at the buffer exceeds the threshold number of bytes of packets at a start of the measurement cycle.

12. The media of claim 10, wherein the operations further comprise modifying the drop probability according to a weight of a class of traffic, wherein each class of traffic is assigned a different weight based at least on priority of the class of traffic.

13. The media of claim 10, wherein the average dequeue rate is estimated based on monitoring packet arrival at the buffer.

14. An apparatus, comprising:
a lightweight latency control module comprising a memory element for storing data and a processor, wherein the processor executes instructions associated with the data, wherein the processor and the memory element cooperate, such that the apparatus is configured for:
determining if a threshold number of bytes of packets are dequeued from a queue of packets maintained in a buffer in the apparatus, wherein the packets are dequeued as they depart from the apparatus, wherein the threshold number of bytes of packets is calculated according to network conditions and network platform;
estimating an average dequeue rate based on a time taken to dequeue the threshold number of bytes of packets during a measurement cycle;
estimating a current queuing latency for the queue of packets based on the estimated average dequeue rate;
determining a target delay based on the estimated average dequeue rate, wherein the target delay varies with the average dequeue rate according to a predetermined relationship, wherein determining the target delay comprises looking up a table representative of the predetermined relationship, wherein according to the predetermined relationship the target delay decreases with increasing average dequeue rate;
calculating a current drop probability associated with a probability that packets arriving at the buffer will be dropped or marked, wherein the current drop probability is calculated using at least the estimated current queuing latency and the target delay looked up from the table; and
dropping an arrived packet at the buffer according to the calculated drop probability.

15. The apparatus of claim 14, wherein the average dequeue rate is estimated when a queue length at the buffer exceeds the threshold number of bytes of packets at a start of the measurement cycle.

16. The apparatus of claim 14, wherein the apparatus is further configured for modifying the drop probability according to a weight of a class of traffic, wherein each class of traffic is assigned a different weight based at least on priority of the class of traffic.

17. The apparatus of claim 14, wherein the average dequeue rate is estimated based on monitoring packet arrival at the buffer.

* * * * *